DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED MAY 11, 1971

886 O.G. 214

T886,010

PROCESS FOR DISTRIBUTING AQUEOUS DISPERSIONS THROUGH A PNEUMACEL BATT

Robert L. Craven and John F. Hesselberth, Wilmington, Del., assignors to E. I. du Pont de Nemours and Company, Wilmington, Del.

Filed Feb. 3, 1970, Ser. No. 8,372
**Int. Cl. B44d *1/44***
U.S. Cl. 117—65.2
1 Sheet Drawing. 8 Pages Specification

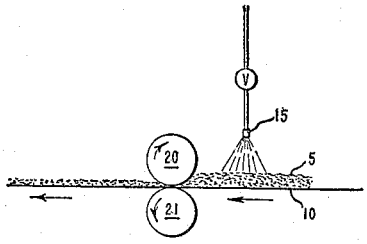

A process for uniformly distributing an aqueous dispersion of a thermoplastic polymeric binder composition through the thickness of a pneumacel-fiber batt. The preferred pneumacel fibers are low density, closed-cell foam fibers of polyethylene terephthalate containing 6–40 grams of an impermeant inflatant, such as perfluorocyclobutane, per 100 grams of polymer. The preferred dispersion composition comprises 40 parts ethylene/vinyl acetate copolymer (24–26% vinyl acetate), 40 parts water, and 20 parts diammonium phosphate. The process comprises (1) applying the aqueous dispersion to the pneumacel-fiber batt until the weight of the batt is increased by between 25 and 250 percent, (2) compressing the wetted batt, preferably by passing it through the nip of two rolls, until the ratio of the height of the compressed batt to the calculated height of the uncompressed batt is between about 0.4 and 0.6, and (3) releasing the compressive forces from the batt.

May 11, 1971 R. L. CRAVEN ET AL T886,010
PROCESS FOR DISTRIBUTING AQUEOUS DISPERSIONS
THROUGH A PNEUMACEL BATT
Filed Feb. 3, 1970
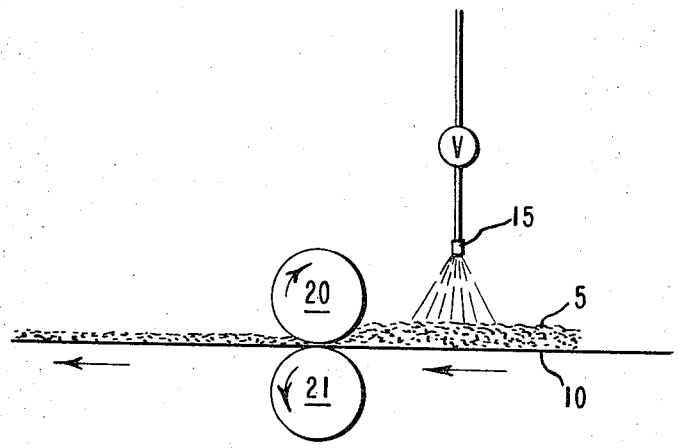
INVENTORS
ROBERT L. CRAVEN
JOHN F. HESSELBERTH
BY John E Dull
ATTORNEY